United States Patent

Enabnit et al.

[15] 3,675,375

[45] July 11, 1972

[54] METHOD FOR MEASURING THE THICKNESS OF BUFFED TIRES

[72] Inventors: Robert S. Enabnit; Merritt W. Wolfe, both of Akron, Ohio

[73] Assignee: The Goodyear Tire & Rubber Company, Akron, Ohio

[22] Filed: March 11, 1971

[21] Appl. No.: 123,205

[52] U.S. Cl. .................. 51/281 R, 51/106 R, 51/165.74
[51] Int. Cl. ................................................. B24b 1/00
[58] Field of Search ........... 51/281 R, 165.71, 165.74, 106 R

[56] References Cited

UNITED STATES PATENTS

| | | | |
|---|---|---|---|
| 2,787,089 | 4/1957 | Hawkinson | 51/106 R X |
| 2,937,478 | 5/1960 | Maker | 51/165.71 |
| 2,985,231 | 5/1961 | Roesch | 51/106 R X |
| 3,553,903 | 7/1967 | Christie | 51/281 R |

*Primary Examiner*—Donald G. Kelly
*Attorney*—F. W. Brunner and Harold E. Hummer

[57] ABSTRACT

A method for measuring the buffed thickness of a tire being prepared for retreading. A metal proximity transducer, on the outer buffed surface of the tire, is periodically used to measure the distance between the transducer and a reference as a means for determining whether a sufficient amount of rubber has been removed and the remaining tire casing is ready for retreading.

25 Claims, 4 Drawing Figures

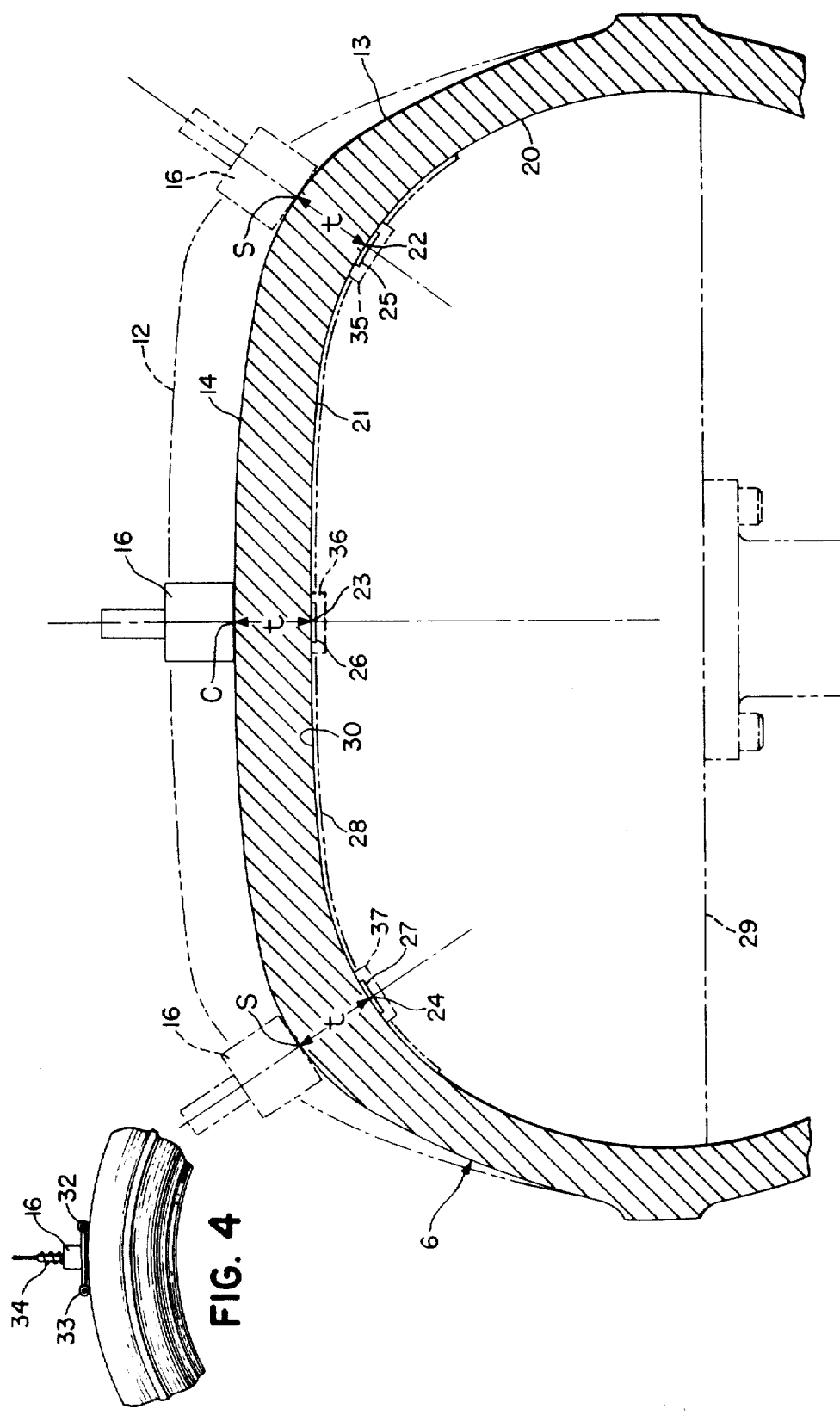

METHOD FOR MEASURING THE THICKNESS OF BUFFED TIRES

BACKGROUND OF THE INVENTION

The retreading of tires has become more complex because of the increasing demand for better tires, this being necessitated by the higher speeds at which automobiles are operated. Many methods employed in the past are simply not precise enough for retreading modern day tires. This is especially true in the operation for removing the worn tread of a tire suitable for retreading. In the past, this particular step was done by an operator who relied on visual observance of the buffed tire to determine when a sufficient amount of rubber had been removed from the tire casing. The removal of rubber is extremely critical, especially in the areas of the shoulders, i.e., the juncture between the tread and sidewalls of the tire, since an improper amount of rubber in this area quite frequently causes separation of the new tread from the older casing. It is important, therefore, that the buffed tire be accurately measured to determine if a sufficient amount of rubber has been removed. Many methods presently employed for measuring buffed tires involve periodically demounting the tire from the buffing machine and using large caliper-type measuring devices for determining the thickness of the buffed casing. Such methods are time consuming and costly and not conducive to retreading large numbers of tires at prices competitive with new tires. The invention is directed to a highly improved method for measuring and determining the thickness of a properly buffed tire casing.

Briefly stated, the invention is in a method for retreading tires. The method comprises mounting a tire on a buffing machine for rotation about the center axis of the tire, and inflating the tire with fluid, under pressure, to an inflation pressure generally specified by the manufacture of the tire buffing equipment. The tire is then rotated and buffed to remove by grinding a predetermined amount of rubber. At a predetermined spot on the outer buffed periphery of the tire casing, the distance between the spot and a point of reference is measured. This measurement is compared to a previously determined, corresponding measurement correlated to rubber thickness to determine whether a sufficient amount of rubber has been removed from the casing at least at the spot being measured.

DESCRIPTION OF THE DRAWING

The following description of the invention will be better understood by having reference to the annexed drawing, wherein:

FIG. 3 is a section of a buffed tire casing showing certain components used for measuring the thickness of the buffed casing; and FIG. 4 is a view of a probe adapted for continuously monitoring or measuring the thickness of the buffed tire casing.

DESCRIPTION OF THE INVENTION

Figure 1:
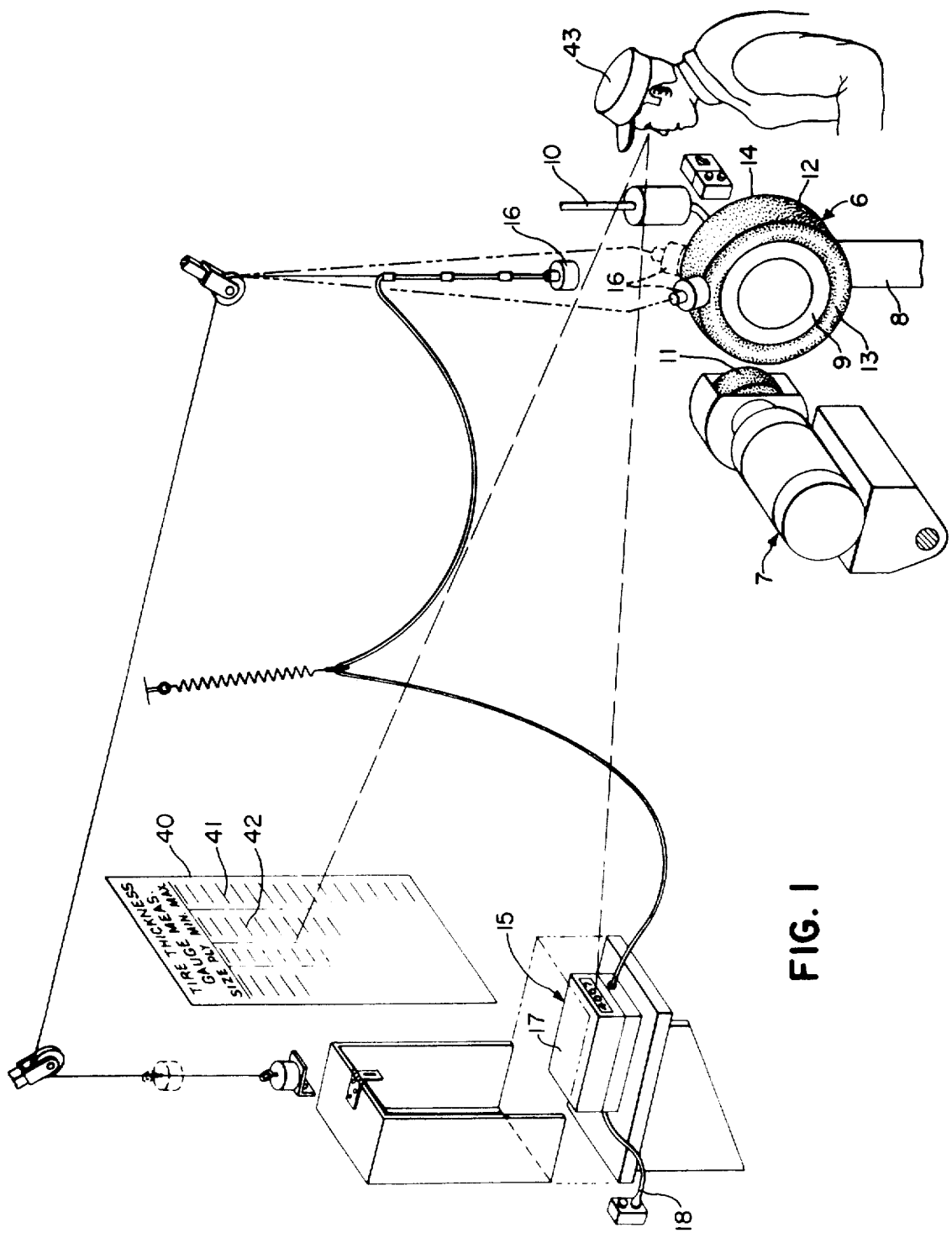
FIG. 1 is a perspective view showing an embodiment of the invention for measuring the buffed thickness of a tire casing when the casing is inflated and mounted on a buffing machine.
Figure 2:
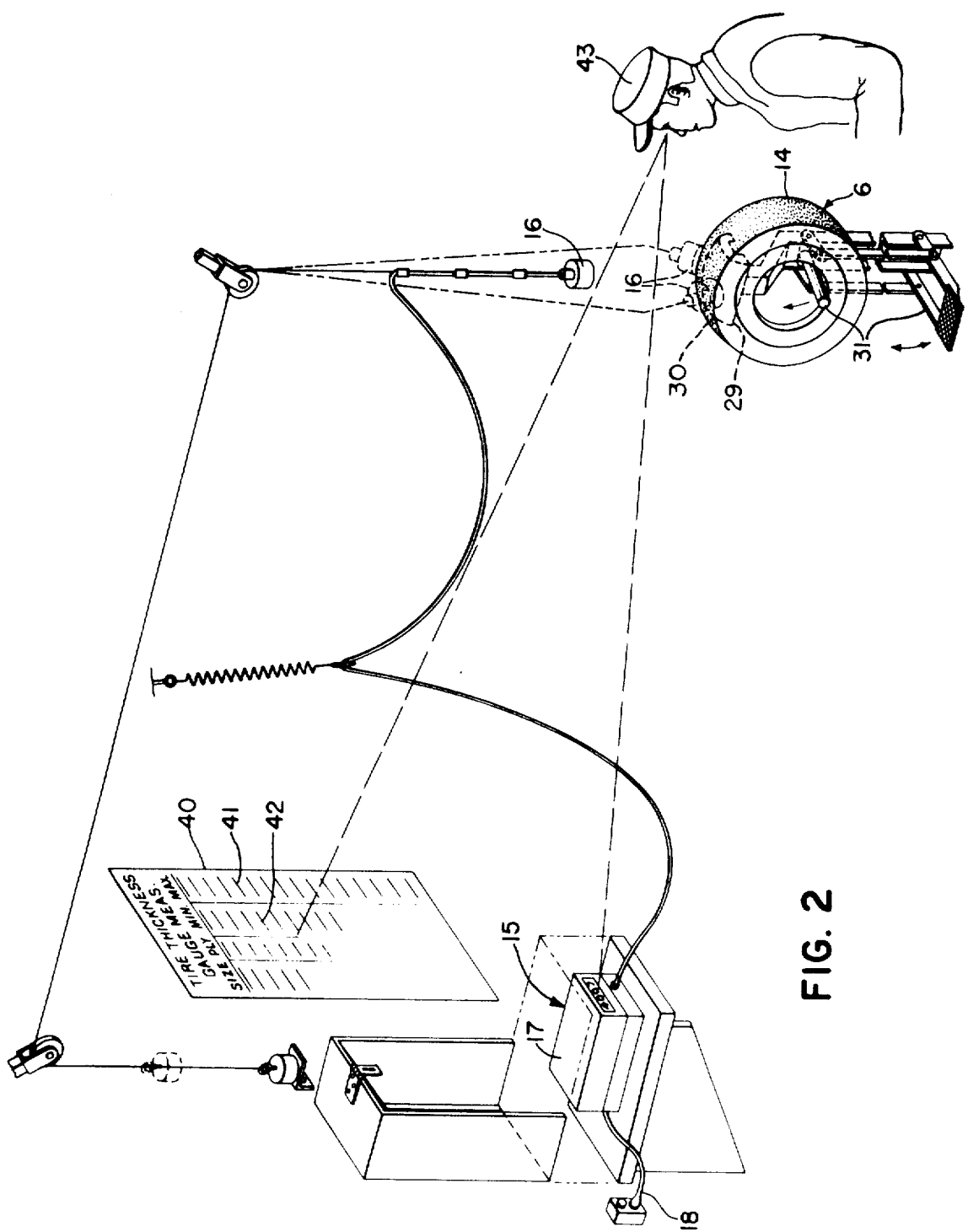
FIG. 2 is a perspective view showing another embodiment of the invention for measuring the buffed thickness of a tire casing when the casing is uninflated and apart from the buffing machine.

Referring more particularly to FIGS. 1 and 2, there is shown a tire 6 mounted on any suitable buffing machine 7 which essentially comprises a machine stand 8 for rotatably supporting a wheel rim 9 on which the tire 6 is mounted; a conventional air pressure system 10 for inflating the mounted tire 6 with fluid, e.g., air under pressure; and a grinding head 11 which may be movable in an arc around the tire 6 for grinding or buffing rubber from the tire 6, i.e., removing a worn tread 12 from the remaining casing 13 of the tire 6 (FIG. 3).

The tire 6 is roughly buffed in accordance with a template which is mountable on the buffing machine 7 and representative of the outer curved periphery 14 of the inflated tire casing 13. Different templates corresponding to different size tires are interchangeable on the buffing machine 7. After roughly buffing the tire 6 in accordance with the template, the buffing machine 7 is stopped and the buffed tire casing 13 is measured for thickness to determine whether a sufficient amount of rubber, i.e., the worn tread 12, has been removed. The buffed tire casing 13 (FIG. 3) is preferably measured at the mid-circumferential centerline C and shoulders S, hereafter referred to as S–C–S. The removal of rubber in the shoulder area is especially critical, because an abundance or inadequate amount of rubber can cause separation of the new tread from the older casing when the retreaded tire is operating at high speeds.

Any suitable electromagnetic induction displacement measuring system 15 may be utilized for checking the thickness of the buffed tire casing 13. The system 15 essentially comprises a metal proximity detector or transducer 16, a digital voltmeter 17 with a ratio capability of 0.9999 to 1, and a power supply 18 which, in this case, is a cable plugged into a conventional 110-volt circuit. This particular system 15 utilizes the effect of electromagnetically induced eddy currents in a metallic or electrically conductive reference. The distance between the reference and inducing transducer or sensing probe 16 is measured and correlated to the thickness $t$ of the buffed tire casing 13, especially at the spots S–C–S.

It is necessary having some type of metallic or highly electrically conductive material as a reference preferably contacting the inner periphery 20 (FIG. 3) of the tire casing 13 in the area of the inner crown 21 where it is desirable to measure the thickness $t$ of the buffed tire casing 13. More specifically, a reference of such material should be at least placed at the points 22, 23, and 24, located on the inner crown 21 in opposite and closest spaced relation from the spots S–C–S where the probe 16 is positioned for measuring the thickness $t$ of the tire casing 13. Pieces 25, 26, and 27 of metallic material, such as an aluminum foil, are secured to the inner crown 21 of the tire casing 13 at the points 22–24. In practice, a continuous strip of aluminum foil 28 about 6 inches wide, is cemented against and laterally across the inner crown 21 of the tire casing 13 prior to mounting and inflating the tire 6 on the buffing machine 7. Any suitable metal-containing liquid or paste may be painted on the inner crown 21 of the tire casing 13 in place of the solid metal foil 28, as previously described. In such cases, the reference at the points 22–24 should have a particle size preferably in the range of from 0.001 to 0.25 inches to be effectively used with the sensing probes 16 presently available.

The sensing probe 16 is placed, by hand, at the various spots S–C–S for measuring the thickness $t$ of the buffed tire casing 13. In essence, the system 15 induces a rapidly alternating magnetic field at the reference or points 22–24 which field, in turn, creates eddy currents in the reference or aluminum foil 28. The effect on this field of eddy currents induced in the aluminum foil 28 at points 22–24 is measured at opposing spots S–C–S and converted or translated to an electrical signal which is sent to the digital voltmeter 17 where the electrical signal is changed to a visual numerical reading. The readings observed on the digital voltmeter 17 are compared with readings that have been previously taken and correlated to predetermined thicknesses of tire material. The calibration of the system 15 is in relation to aluminum foil backing and may be recalibrated when other metal backings are used. The buffing operation is continued in the spots where the reading is below the reading corresponding to the predetermined desired thickness $t$ of the buffed tire casing 13.

The system 15 (FIG. 2), including the probe 16, may be used in conjunction with a mandrel 29 located apart from the buffing machine 7 and requiring demounting the buffed tire casing 13 from the buffing machine 7 for mounting on the mandrel 29 where the thickness of the casing 13 is measured. The mandrel 29 is composed of any suitable metal, e.g., aluminum, and has a rigid outer curved surface 30 for engaging the inner crown 21 of the buffed tire casing 13 at the points 22–24. A combination rod and linkage system 31 is used for causing relative movement between the tire casing 13 and mandrel 29, whereby the outer curved surface 30 of the mandrel 29 is brought into contact with the inner crown 21 of the tire casing 13. Moreover, the rod and linkage system 31 maintains the mandrel 29 firmly against the inner crown 21 of the tire casing 13 while the thickness of the casing 13 is being measured.

Three different probes similar to probe 16 may be used together as shown in FIG. 3 for continuously monitoring the thickness of the tire casing 13 as it is being buffed. The probes 16 (FIG. 4) are each mounted on a set of rollers 32 and 33 which rollingly engage the buffed casing 13 at the spots S–C–S. The system 15 can be adjusted to accommodate the slight distance $d$ that the probes 16 are spaced from the outer buffed periphery 14 of the tire casing 13. The three probes 16 are mounted for unitary rotation into and out of engagement with the tire 6 by any suitable means. Moreover, any means such as a coil spring 34 can be utilized for biasing the rollers 31 and 32 against the tire 6 as it rotates. In this way, continuous readings can be taken of the thickness $t$ of the tire casing 13 without stopping operation of the buffing machine 7. The continuous measurements of the tire casing thickness may be monitored by a computer for automatically adjusting the grinding or buffing process in accordance with a difference in signals received by the computer and those stored in the computer for comparison with the signal corresponding to the measurement. In this way, the buffing operation may be continually monitored to obtain a precisely buffed tire casing suitable for retreading.

Another system employing magnetic fields, is the use of a conventional gaussmeter for measuring the magnetic field at spots S–C–S produced by any suitable magnetic material such as permanent magnets 35, 36, and 37 secured by any suitable adhesive against the inner crown 21 of the tire casing 13 at the points 22–24. Other types of magnetic material include any suitable ferro-magnetic material, e.g., barium ferrite, which may be easily painted or placed in a paste form on the inner crown 21 of the tire casing 13. Such material is readily magnetized by permanent or electro-magnets prior to mounting the tire 6 on the buffing machine 7. It should also be appreciated that any suitable mechanical device may be provided within the rim 9 for holding and moving the permanent magnets 35–37 into and out of compressive engaged relation with the inner crown 21 of the tire casing 13 at the points 22–24. Thus, both systems employed magnetic fields created between the spots S–C–S and points 22–24 as a means for determining the thickness of the tire casing. Both systems are responsive to certain distinguishable, measurable characteristics of the magnetic fields; namely, both systems measure the strength of a magnetic field at the spots S–C–S, i.e., one measures the effect of the eddy currents induced in the reference by the magnetic field, and the other measures the effect of a magnetized reference.

The previously described system 15 is normally used for measuring the thickness of a buffed tire casing 13 reinforced with textile cords which do not distort measurements of the magnetic field. Such is not the case when the tire 6 is reinforced with metal cords. However, the invention is easily adapted for use in this situation by measuring the thickness of rubber, or the distance between the spots S–C–S and the closest opposing metal cords which may be embedded in the reinforcing belt or breaker structure in the case of bias-belt or radial tires, or in the carcass piles of a regular bias-type tire. The distance between the outer buffed periphery 14 of the tire casing 13 and the closest metal cord, similar to the thickness of the casing itself, is generally known or can be readily figured for any given size of tire. Thus, by quick reference to a chart 40 showing maximum and minimum numerical readings 41 and 42 previously obtained in relation to different tire sizes, an operator 43 can easily determine whether a sufficient amount of rubber has been removed leaving a quality tire casing 13 suitable for retreating. The buffed tire casing 13 is mounted, for example, on a tread laminator where strips of unvulcanized rubber are wound around the buffed periphery 14 of the buffed casing 13. The retreaded tire is then placed in a mold where the new tread is vulcanized onto the older casing 13.

Thus, there has been described a method and apparatus for precisely buffing tire casings to provide a highly improved retreaded tire.

What is claimed is:

1. A method of retreading a tire, comprising the steps of:
   a. mounting a tire, including a tread and casing, for rotation about the center axis of the tire;
   b. inflating the tire with fluid under pressure;
   c. buffing the tread as the tire rotates; and
   d. measuring at a spot on the outer buffed periphery of the casing, a distinguishable characteristic of a magnetic field produced between the spot and an electrically conductive reference contacting the casing in opposed spaced relation from the spot, the measurement being correlated to the thickness of tire material between the spot and reference.

2. The method of claim 1, wherein the reference includes a piece of metallic material contacting the inner crown of the casing at a point which is opposite and closest the spot.

3. The method of claim 2, which includes contacting the inner crown of the casing at the point with the metallic material when the tire is uninflated.

4. The method of claim 3, wherein the metallic material includes at least a strip of aluminum foil secured to the casing in spanning relation across the inner crown of the casing.

5. The method of claim 3, wherein the metallic material includes a metal tire cord embedded in the tire in opposite, closest spaced relation from the spot.

6. The method of claim 3, wherein the metallic material includes metal particles in a liquid or paste on the inner crown of the casing, the particles having a particle size in the range of from 0.001 – 0.25 inches.

7. The method of claim 3, which includes measuring at spots which are at least in the shoulder areas of the tire.

8. The method of claim 1, wherein the step of measuring includes the steps of:
   e. inducing a rapidly alternating magnetic field at a reference disposed on the inner crown of the casing at a point opposite and closest the spot, to produce eddy currents in the reference; and
   f. measuring at the spot, the effects of the eddy currents in the reference.

9. The method of claim 8, which includes the steps of:
   g. translating the measurement of the effects of said eddy currents to an electrical signal;
   h. changing the electrical signal to a visual numerical reading;
   i. comparing the reading to a corresponding, predetermined desired reading; and
   j. buffing the casing in the area of the tread in accordance with a variance in the readings.

10. The method of claim 9, wherein the step of buffing is continued when the measured reading is less than the desired reading.

11. The method of claim 10, wherein the step of measuring is performed while the tire is inflated and mounted.

12. The method of claim 11, wherein the reference includes at least a strip of aluminum foil secured against and across the inner crown of the casing.

13. The method of claim 12, which includes placing a metal proximity transducer on the buffed periphery at the spot to induce the magnetic field.

14. The method of claim 9, which includes the steps of:
   k. deflating the casing after buffing and prior to measuring the effects of the eddy currents;
   m. mounting the deflated buffed casing on a metal mandrel having a curved outer surface;

n. causing relative movement between the buffed casing and mandrel to move the curved outer surface of the mandrel into contacting relation with the inner crown of the casing; and o. placing a metal proximity transducer on the buffed periphery at the spot to induce the magnetic field.

15. The method of claim 14, wherein the curved outer surface of the mandrel is rigid and consists essentially of aluminum.

16. The method of claim 1, wherein the reference includes magnetic material contacting the inner crown of the casing at a point which is opposite and closest the spot.

17. The method of claim 16, wherein the magnetic material includes a permanent magnet.

18. The method of claim 16, wherein the magnetic material includes magnetized ferro-magnetic material.

19. The method of claim 16, wherein the magnetic material includes magnetized barium ferrite.

20. The method of claim 1, wherein the step of measuring includes:

e. producing a magnetic field at a reference disposed on the inner crown of the casing at a point opposite and closest the spot; and f. measuring the magnetic field at the spot.

21. The method of claim 20, which includes the steps of:

g. translating the measurement of the magnetic field to an electrical signal;

h. changing the electrical signal to a visual numerical reading;

i. comparing the reading to a corresponding, predetermined desired reading; and j. buffing the casing in the area of the tread in accordance with a variance in the readings.

22. The method of claim 21, wherein a gaussmeter is placed on the buffed periphery at the spot to measure the magnetic field.

23. The method of claim 22, wherein the step of measuring is performed when the tire is inflated and mounted.

24. The method of claim 23, wherein the reference includes a permanent magnet cemented on the inner crown of the casing at the point.

25. The method of claim 23, wherein the reference includes magnetized barium ferrite on the inner crown of the casing at the point.

* * * * *